United States Patent Office.

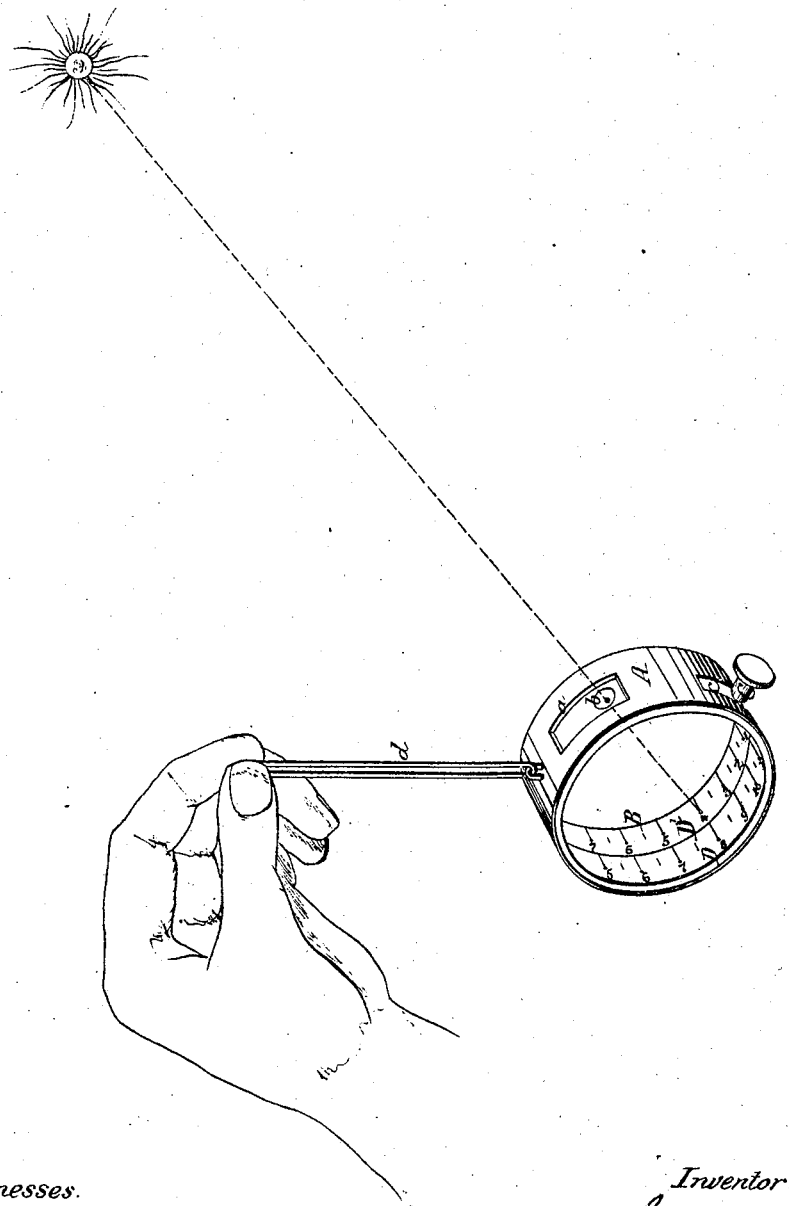

IMPROVEMENT IN SOLAR TIME INDICATORS.

JAMES HIGGINS, OF EAST CAMBRIDGE, MASSACHUSETTS.

Letters Patent No. 60,630, dated December 18, 1866.

The Schedule referred to in these Letters Patent and making part of the same.

TO ALL WHOM IT MAY CONCERN:

Be it known that I, JAMES HIGGINS, of East Cambridge, in the county of Middlesex, and State of Massachusetts, have invented a new and improved Solar Time Indicator; and I do hereby declare that the following is a full, clear, and exact description thereof, which will enable others skilled in the art to make and use the same, reference being had to the accompanying drawing, forming part of this specification.

The drawing is a perspective view of my invention.

My present invention relates to a device for indicating the time of day by the sun. It consists of two rings, the one encircling the other; the outer one having a slot cut in a circumferential direction in one side, and through the inner one is made an aperture, which latter, on moving the inner ring, will travel in the direction of said slot; the said inner ring carrying a screw, or the like, for operating it, and a scale marked with the hours and fractional parts of hours.

A designates the outer, and B the inner, ring. In the present instance they are both metallic strips, of a proper width. In the outer one a slot, $a$, is cut. It is on one side above the plane of a horizontal axial line, if such be drawn through the device when it is held in the proper position for indicating the time. Through the inner ring B an aperture, $b$, is made, so that on moving the inner ring it will travel along the slot $a$. A set-screw, $C'$, screwing into the inner ring, and passing through a slot, $c$, in the outer ring, and having a shoulder which, when it is screwed down hard, will strike against the periphery of the outer ring, so as to fasten the two rings together, or, more correctly speaking, prevent the inner ring moving when set, is provided. D D' are graduated time-tables, marked upon the ring B opposite the aperture $b$. For the morning, the numbers commence on one side and run in one direction, and for the afternoon, the reverse is the case. A cord, $d$, is secured to the top of the device by which to hold it up. In using the indicator, hold the string in one hand and steady it with the fingers of the other till it hangs plumb; then turn the ring toward the sun so that a sunbeam may pass through the aperture $b$ and strike against the scale on the inner ring, and this indicates the time of day. By regulating the device once a day, say at twelve, m., which is done by moving the aperture so that the sunbeam, when the sun is in the meridian, will be caused to strike on the twelve o'clock mark, the indicator will indicate the solar time correctly for that day. An adjustment every few days will give the time sufficiently near correctness for all practical purposes. By thus regulating the device it will serve to indicate solar time in different latitudes.

What I claim as new, and desire to secure by Letters Patent, is—

The combination of the ring A, having slots $a$ and $c$ in it, with the ring B provided with the scales D D' and set-screw C, the same constituting a solar time indicator, substantially as herein shown and described.

JAMES HIGGINS.

Witnesses:
WM. A. MUNROE,
K. S. CHAFFEE.